Patented Feb. 15, 1949

2,461,572

UNITED STATES PATENT OFFICE 2,461,572

PROCESS OF RIPENING CELLULOSE ESTERS

Robert D. Rowley and Robert F. Thompson, Narrows, Va., assignors to Celanese Corporation of America, a corporation of Delaware No Drawing. Application November 6, 1945, Serial No. 627,100

7 Claims. (Cl. 260—230)

This invention relates to the preparation of highly stable organic acid esters of cellulose, and relates more particularly to an improved process for ripening primary organic acid esters of cellulose whereby secondary or ripened cellulose esters of improved stability characteristics are obtained.

An object of this invention is the production of highly stable secondary or ripened organic acid esters of cellulose.

Another object of this invention is the provision of an improved ripening procedure whereby primary organic acid esters of cellulose may be ripened to yield secondary organic acid esters of cellulose without employing an acid catalyst, such as sulfuric acid, to aid the ripening.

Other objects of this invention will appear from the following detailed description.

In the process of preparing organic acid esters of cellulose, such as cellulose acetate, for example, the esterification reaction is usually carried out by treating cellulose with an organic acid anhydride in the presence of a catalyst, such as phosphoric acid or sulfuric acid, and an organic acid diluent, or solvent, for the cellulose ester being formed. The fully esterified cellulose tri-ester produced is obtained in the form of a viscous, homogeneous solution in the organic acid diluent employed. Water is then added to this primary cellulose ester solution in an amount sufficient to convert any organic acid anhydride remaining to the corresponding acid. The primary cellulose ester, usually after the addition of a further quantity of water, is permitted to hydrolyze or ripen in solution from a cellulose tri-ester to a secondary cellulose ester, i. e. one of a lower degree of esterification, having the desired solubility characteristics. During ripening not only are acyl groups hydrolyzed but in addition combined sulfuric acid is removed. Water and/or other non-solvent for the cellulose ester is then added in sufficient amounts to precipitate the ripened or secondary cellulose ester from solution.

The precipitated cellulose ester is washed with water to remove as much acid and other non-cellulose ester materials as possible and is then subjected to a stabilizing treatment with the object of still further reducing its content of combined sulfuric acid. Any combined sulfuric acid imparts to the cellulose ester a tendency to decompose, degrade and/or discolor. The degree of stability is measured by the degree of acidity developed when a sample of the cellulose ester is treated with distilled water at an elevated temperature and pressure for a predetermined period of time. The development of excess acidity denotes a product of unsatisfactory stability. Any improvement in the stability characteristics of said ripened organic acid esters of cellulose which can be effected during ripening itself, avoiding the necessity for employing a separate stabilizing treatment, will obviously, render the process of producing said cellulose esters far more efficient.

We have now found that ripened organic acid esters of cellulose of improved stability characteristics may be obtained by an improved ripening process. In accordance with our invention, we prepare said stable ripened organic acid esters of cellulose by first neutralizing all of the acid catalyst present in the primary cellulose ester solution obtained on the completion of esterification, then heating the neutralized solution to a temperature of 80 to 130° C. for 4 to ½ hours, and after adding water for ripening, ripening the primary cellulose ester in the heated solution to a secondary cellulose ester of the desired solubility characteristics.

It is desirable that a slight excess of acid anhydride be present during the heating step. Accordingly, where the water added with the neutralizing agent and the acid catalyst are sufficient to react with all of the unreacted acid anhydride remaining in the primary solution at the completion of esterification, additional anhydride should be added prior to heating. The ripened or secondary organic acid ester of cellulose obtained may then be precipitated from solution in a desirable fibrous form by the addition of an excess of water thereto. After being washed neutral, the precipitated ester may then be dried. Our novel ripening process yields organic acid esters of cellulose of superior stability characteristics and the cellulose esters so obtained do not require any further stabilization prior to being employed for the production of yarns, filaments, sheets, molding materials, and the like.

Thus, in the preparation of highly stable, ripened or hydrolyzed cellulose acetate by our novel ripening process, cellulose, with or without a pretreatment to render it more reactive, is acetylated with acetic anhydride and an acid catalyst, e. g. phosphoric or sulfuric acid, employing glacial acetic acid as the solvent for the cellulose acetate formed. The pretreatment may comprise treating the cellulose with organic acids or organic acids containing some sulfuric acid. Part of the sulfuric acid employed as the catalyst as well as part of the glacial acetic acid may be introduced in the pre-treatment. When acetylation is completed, the sulfuric acid in the primary solution of cellulose acetate obtained is neutralized by the addition of a sufficient quantity of a suitable neutralizing agent thereto. The neutralized solution is then heated to a temperature of 80 to 130° C. for 4 to ½ hours prior to ripening.

As stated, the amount of water introduced with the neutralizing agent, where the latter is added in aqueous solution, or produced by the neutralization reaction, should preferably be insufficient to hydrolyze all of the acetic anhydride present. Where the amount of water present is such as to destroy all of the remaining acetic anhydride, additional acetic anhydride should be added to maintain an excess of acetic anhydride in the solution during the heat treatment.

As examples of neutralizing agents which may be employed, there may be mentioned magnesium acetate, zinc acetate, aluminum acetate, calcium acetate, strontium acetate, barium acetate, strontium oxide, barium oxide, strontium hydroxide and barium hydroxide. We prefer to avoid the use of neutralizing agents which form sodium salts since we have found that the presence of sodium salts during ripening is undesirable since sodium salts, even in relatively small quantities, tend to reduce the extent of the splitting off of the sulfates during ripening. In larger concentrations, the presence of sodium salts may even entirely prevent the splitting off of said sulfates.

Following the heat treatment of the neutralized primary solution, sufficient water is added to destroy the acetic anhydride remaining and from 0.4 to 1.5 parts by weight of water, based on the original amount of cellulose acetylated, are added for ripening. Ripening is then conducted without any ripening catalyst present at a temperature of 80 to 130° C. for 100 to 2 hours, or until the desired solubility characteristics or acetyl value is reached. The ripened or hydrolyzed cellulose acetate is then precipitated from solution by the addition of an excess of water thereto. The precipitated cellulose acetate may then be washed neutral and dried. A highly stable cellulose acetate is thus obtained.

In order further to illustrate our invention, but without being limited thereto, the following example is given:

*Example*

100 parts by weight of cotton are pretreated with a mixture of 1 part by weight of sulfuric acid, 3 parts by weight of water and 100 parts by weight of glacial acetic acid. The mixture is tumbled for a short time to ensure a uniform distribution of the liquid and is then allowed to stand for 8 hours at a temperature of 35° C. to complete the activation of the cellulose. After this pretreatment, the cotton is entered into an acetylizer containing 300 parts by weight of acetic anhydride, 400 parts by weight of acetic acid and 15 parts by weight of sulfuric acid. The acetylation reaction is allowed to continue for 8 hours with a peak temperature of 30° C. being reached. At the completion of esterification, the sulfuric acid in the primary solution of cellulose acetate obtained is neutralized by adding a sufficient quantity of magnesium acetate thereto. If necessary, additional acetic anhydride is also added to maintain a slight excess of acetic anhydride. The neutralized solution of primary cellulose acetate is then heated to a temperature of 85° C. and maintained at this temperature for 3 hours. Water is then added to the heated solution in an amount equal to 45% on the weight of the original cellulose and ripening is effected by maintaining the solution of cellulose acetate at a temperature of 85° C. for about 95 hours. The ripened cellulose acetate obtained on precipitation with an excess of water has an acetyl value of 53.2%, calculated as acetic acid. This cellulose acetate has a high order of stability as indicated by the very slight acidity developed when heated with water.

While our invention has been more particularly described in connection with the production of highly stable, ripened cellulose acetate, it will be understood, of course, that our novel process may also be employed in the production of other highly stable organic acid esters of cellulose. Examples of other organic acid esters of cellulose which may be prepared by said novel process are cellulose propionate and cellulose butyrate as well as mixed esters, such as cellulose acetate-propionate and cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. In a process for the production of highly stable organic acid esters of cellulose wherein cellulose is esterified with an aliphatic acid anhydride employing an aliphatic acid as solvent and an inorganic acid catalyst, the steps which comprise neutralizing the acid catalyst in the primary cellulose ester solution obtained on completion of esterification by adding a neutralizing agent thereto, positively heating the neutralized primary solution to a temperature above the esterification temperature and maintaining it at said elevated temperature for a short period of time while said solution contains unreacted aliphatic acid anhydride, adding water for ripening to said neutralized solution, and ripening the primary cellulose ester in solution to a secondary cellulose ester at an elevated temperature.

2. In a process for the production of highly stable organic acid esters of cellulose wherein cellulose is esterified with an aliphatic acid anhydride employing an aliphatic acid as solvent and an inorganic acid catalyst, the steps which comprise neutralizing the acid catalyst in the primary cellulose ester solution obtained on completion of esterification by adding a neutralizing agent thereto, positively heating the neutralized primary solution to a temperature above the esterification temperature and maintaining it at said elevated temperature for a short period of time while said solution contains unreacted aliphatic acid anhydride, adding water for ripening to said neutralized solution, and ripening the primary cellulose ester in solution to a secondary cellulose ester at an elevated temperature, the esterification and ripening being conducted in the absence of sodium salts during any stage of said reactions.

3. In a process for the production of highly stable cellulose acetate wherein cellulose is esterified with acetic anhydride employing acetic acid as solvent and an inorganic acid catalyst, the steps which comprise neutralizing the acid catalyst in the primary cellulose acetate solution obtained on completion of acetylation by adding a neutralizing agent thereto, positively heating the neutralized primary solution to a temperature above the acetylation temperature and maintaining it at said elevated temperature for a short period of time while said solution contains unreacted acetic anhydride, adding water for ripening to said neutralized solution, and ripening the primary cellulose acetate in solution to a secondary cellulose acetate at an elevated temperature.

4. In a process for the production of highly stable cellulose acetate wherein cellulose is esterified with acetic anhydride employing acetic acid as solvent and sulfuric acid as catalyst, the steps which comprise neutralizing the sulfuric acid catalyst in the primary cellulose acetate solution obtained on completion of acetylation by adding a neutralizing agent thereto, positively heating the neutralized primary solution to a temperature above the acetylation temperature and maintaining it at said elevated temperature for a short period of time while said solution contains unreacted acetic anhydride, adding water for ripening to said neutralized solution, and ripening the primary cellulose acetate in solution to a secondary cellulose acetate at an elevated temperature.

5. In a process for the production of highly stable cellulose acetate wherein cellulose is esterified with acetic anhydride employing acetic acid as solvent and sulfuric acid as catalyst, the steps which comprise neutralizing the sulfuric acid catalyst in the primary cellulose acetate solution obtained on completion of acetylation by adding a neutralizing agent thereto, heating the neutralized primary solution and maintaining it at a temperature of 80 to 130° C. for 4 to ½ hours while said solution contains unreacted acetic anhydride, adding water for ripening to said heated solution, and ripening the primary cellulose acetate in solution to a secondary cellulose acetate at an elevated temperature.

6. In a process for the production of highly stable cellulose acetate wherein cellulose is esterified with acetic anhydride employing acetic acid as solvent and sulfuric acid as catalyst, the steps which comprise neutralizing the sulfuric acid catalyst in the primary cellulose acetate solution obtained on completion of acetylation by adding a neutralizing agent thereto, heating the neutralized primary solution and maintaining it at a temperature of 80 to 130° C. for 4 to ½ hours while said solution contains unreacted acetic anhydride, adding water for ripening to said heated solution, and ripening the primary cellulose acetate in solution to a secondary cellulose acetate at a temperature of 80 to 130° C.

7. In a process for the production of highly stable cellulose acetate wherein cellulose is esterified with acetic anhydride employing acetic acid as solvent and sulfuric acid as catalyst, the steps which comprise neutralizing the sulfuric acid catalyst in the primary cellulose acetate solution obtained on completion of acetylation by adding a neutralizing agent thereto, heating the neutralized primary solution and maintaining it at a temperature of 80 to 130° C. for 4 to ½ hours while said solution contains unreacted acetic anhydride, adding water for ripening to said heated solution in an amount of 0.4 to 1.5 parts by weight on the weight of the original cellulose and ripening the primary cellulose acetate in solution to a secondary cellulose acetate at a temperature of 80 to 130° C.

ROBERT D. ROWLEY.
ROBERT F. THOMPSON.

REFERENCES CITED

The following references are of record in the file of this patent:

UNITED STATES PATENTS

| Number | Name | Date |
|---|---|---|
| 2,203,749 | Seymour et al. | June 11, 1940 |
| 2,285,536 | Seymour et al. | June 9, 1942 |